(12) United States Patent
Brutman et al.

(10) Patent No.: US 10,808,084 B2
(45) Date of Patent: Oct. 20, 2020

(54) METHODS FOR MAKING RENEWABLE AND CHEMICALLY RECYCLABLE CROSSLINKED POLYESTER ELASTOMERS

(71) Applicant: Regents of the University of Minnesota, Minneapolis, MN (US)

(72) Inventors: Jacob Paul Brutman, Red Bank, NJ (US); Deborah Kay Schneiderman, Chicago, IL (US); Marc Andrew Hillmyer, Minneapolis, MN (US); Guilhem Xavier De Hoe, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 85 days.

(21) Appl. No.: 15/712,997

(22) Filed: Sep. 22, 2017

(65) Prior Publication Data
US 2018/0100041 A1    Apr. 12, 2018

Related U.S. Application Data

(60) Provisional application No. 62/398,894, filed on Sep. 23, 2016.

(51) Int. Cl.
*C08J 3/24* (2006.01)
*C08J 11/24* (2006.01)
*C08K 3/36* (2006.01)
*C08K 9/00* (2006.01)
*C08K 3/013* (2018.01)
*C08K 3/04* (2006.01)
(Continued)

(52) U.S. Cl.
CPC ............. *C08J 3/24* (2013.01); *C08J 11/24* (2013.01); *C08K 3/013* (2018.01); *C08K 3/36* (2013.01); *C08K 9/00* (2013.01); *C08J 2367/04* (2013.01); *C08K 3/04* (2013.01); *C08K 3/22* (2013.01); *C08K 3/26* (2013.01); *Y02W 30/706* (2015.05)

(58) Field of Classification Search
CPC .. C08J 3/24; C08J 3/243; C08K 3/011; C08K 5/0025
USPC ............................................................ 524/601
See application file for complete search history.

(56) References Cited

U.S. PATENT DOCUMENTS 2,977,385 A * 3/1961 Fowler ............... C08G 18/4269
560/89
3,169,945 A * 2/1965 Young ..................... C08G 63/08
528/355

(Continued)

FOREIGN PATENT DOCUMENTS

EP          0662103 A1    7/1995
JP       2005260458 A    9/2005
(Continued)

OTHER PUBLICATIONS

Xiong et al. "Scalable production of mechanically tunable block polymers from sugar", PNAS Early Edition, 111(23), 8357-8362, Jun. 2014. Published online May 27, 2014 (Year: 2014).*

(Continued)

*Primary Examiner* — Jane L Stanley
(74) *Attorney, Agent, or Firm* — Shumaker & Sieffert, P.A.

(57) ABSTRACT

A method includes reacting a polymer derived from a lactone with a cyclic carbonate compound comprising 2 to 5 cyclic carbonate moieties and a catalyst to form a crosslinked polylactone elastomer.

10 Claims, 5 Drawing Sheets

(51) Int. Cl.
C08K 3/26 (2006.01)
C08K 3/22 (2006.01)

(56) References Cited

U.S. PATENT DOCUMENTS

| | | | |
|---|---|---|---|
| 4,045,418 A * | 8/1977 | Sinclair | C08G 63/08 |
| | | | 528/357 |
| 4,661,535 A | 4/1987 | Borroff et al. | |
| 5,502,158 A | 3/1996 | Sinclair et al. | |
| 6,136,869 A | 10/2000 | Ekart et al. | |
| 8,563,664 B2 * | 10/2013 | Seppala | C08F 283/00 |
| | | | 525/450 |
| 10,160,741 B2 * | 12/2018 | Hillmyer | C07D 309/30 |
| 2018/0118880 A1 * | 5/2018 | Chen | C08G 63/823 |

FOREIGN PATENT DOCUMENTS

| | | |
|---|---|---|
| JP | 2007070516 A | 3/2007 |
| WO | 2015161169 A1 | 10/2015 |

OTHER PUBLICATIONS

Lowe et al. "Functional biorenewable polyesters from carvone-derived lactones", Polym. Chem., 211, 2, 702-708. published online Dec. 10, 2010 (Year: 2010).*

Lecomte et al. "New prospects for the grafting of functional groups onto aliphatic polyesters. Ring opening polymerization of alpha-or gamma-substituted epsilon-caprolactone followed by chemical derivatization of the substituents", Macromol. Symp., 2006, 240, 157-165. May 2006 (Year: 2006).*

Ding et al. "Roles of monomer binding and alkoxide nucleophilicity in aluminum-catalyzed polymerization of epsilon-caprolactone", Macromolecules, 2012, 45, 5387-5396. published Jun. 18, 2012 (Year: 2012).*

Yang et al. "In vitro enzymatic degradation of the cross-linked poly(epsilon-caprolactone) implants", Polymer Degradation and Stability, 112 (2015), 10-19. published online Dec. 13, 2014 (Year: 2014).*

Watts et al. "Strong, resilient, and sustainable aliphatic polyester thermoplastic elastomers", Biomacromolecules, 2017, 18, 1845-1854. published May 3, 2017 (Year: 2017).*

Mannion et al. "synthesis and rheology of branched multiblock polymers based on polylactide", Macromolecules, 2016, 49, 4587-4598. published Jun. 16, 2016 (Year: 2016).*

Brutman et al. "Renewable, degradable, and chemically recyclable cross-linked elastomers", Ind. Eng. Chem. Res., 2016, 55, 11097-11106. published Oct. 11, 2016 (Year: 2016).*

Fortman et al. "Approaches to sustainable and continually recyclable cross-linked polymers", ACS Sustainable Chem. Eng., 2018, 6, 11145-11159. published Aug. 26, 2018 (Year: 2018).*

Van der Ende et al. "Approach to formation of multifunctional polyester particles in controlled nanoscopic dimensions", JACS, 2008, 130, 8706-8713. published online Jun. 11, 2008 (Year: 2008).*

Al-Azemi et al., "Synthesis of novel bis- and tris-(cyclic carbonate)s and their use in preparation of polymer networks," Polymer 43, Elsevier, Dec. 7, 2001, 7 pages.

Brutman et al., "Sustainable Polyester Elastomers," University of Minnesota, poster presented Apr. 2016, 1 page.

Fortman et al., "Mechanically Activated, Catalyst-Free Polyhydroxyurethane Vitrimers," Journal of the American Chemical Society, Oct. 23, 2015, 4 pages.

Han et al., "Effect of peroxide crosslinking on thermal and mechanical properties of poly(ε-caprolactone)," Polymer International, Society of Chemical Industry, May 31, 2006, 8 pages.

Martello et al., "Bulk Ring-Opening Transesterification Polymerization of the Renewable O-Decalactone Using an Drganocatalyst," ACS Macro Letters, Nov. 30, 2011, 5 pages.

Miller et al., "Sustainable Polymers: Opportunities for the Next Decade," ACS Macro Letters, Jun. 5, 2013, 5 pages.

Schneiderman et al., "Chemically Recyclable Biobased Polyurethanes," ACS Macro Letters, Apr. 5, 2016, 4 pages.

Simon et al., "The Mechanism of TBD-Catalyzed Ring-Opening Polymerization of Cyclic Esters," Journal of Organic Chemicals, vol. 72, No. 25, Sep. 24, 2007, 7 pages.

Xiong et al., "Scalable production of mechanically tunable bloc polymers from sugar," Applied Biological Sciences, Apr. 11, 2014, 6 pages.

Yang et al., "Biodegradable cross-linked poly9trimethylene carbonate) networks for implant applications: Synthesis and properties," Polymer 54, Elsevier, Apr. 6, 2013, 8 pages.

Yevstropov et al., "Calorimetric study of δ-valerolactone, poly-δ-valerolactone and of the process of polymerization of δ-valerolactone in the 118 to 340 K temperature range," Vysokomolekulliarnye Soedineniia, Seriia a/Akademiia nauk SSSR, Translation provided for the Summary only, 1982, 8 pp. (Applicant points out, in accordance with MPEP 509.04(a), that the year of publication, 1982, is sufficiently earlier than the effective U.S. filing date, so that the particular month of publication is not in issue.).

U.S. Appl. No. 62/301,126, by Marc Andrew Hillmyer, filed Feb. 29, 2016.

* cited by examiner

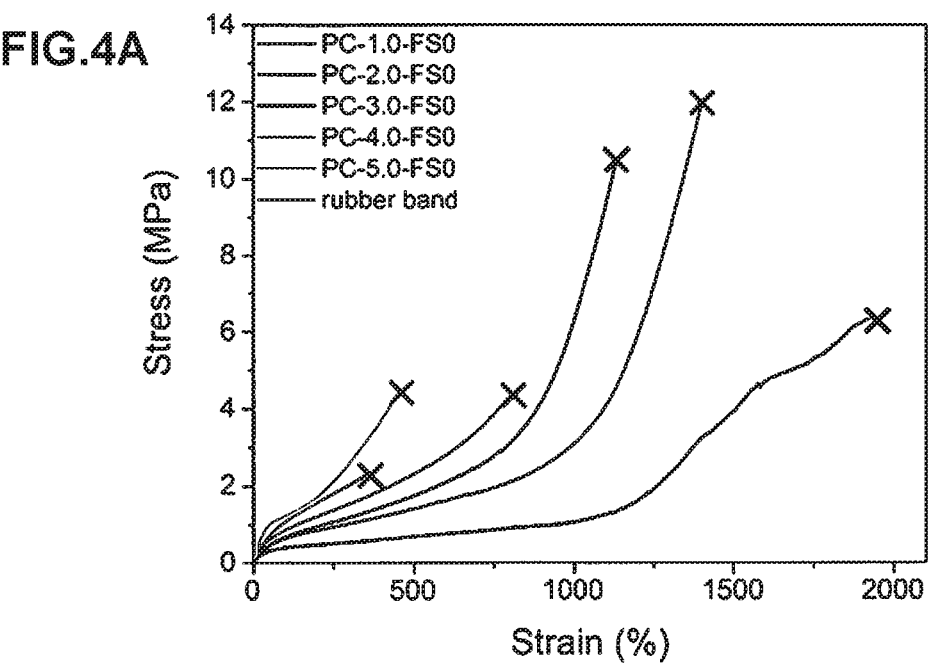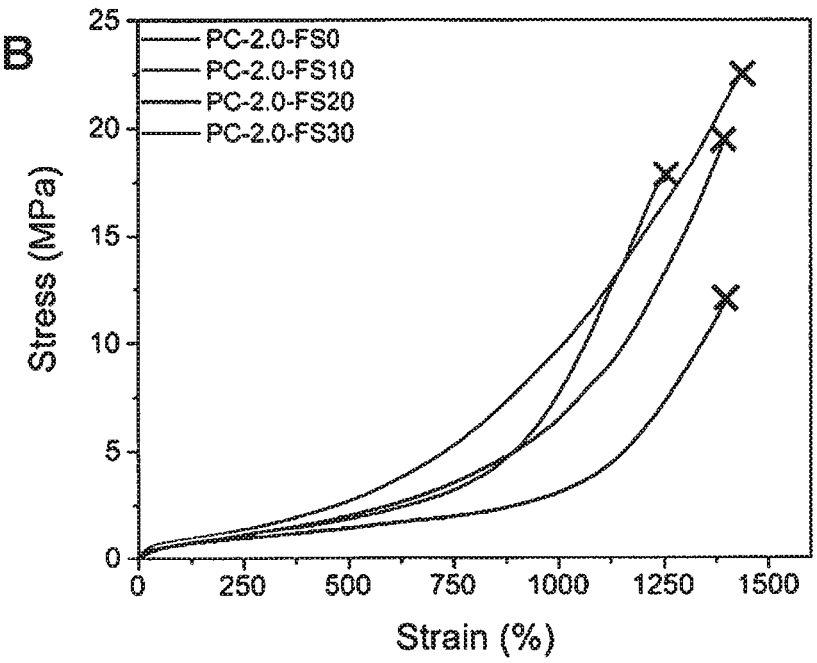

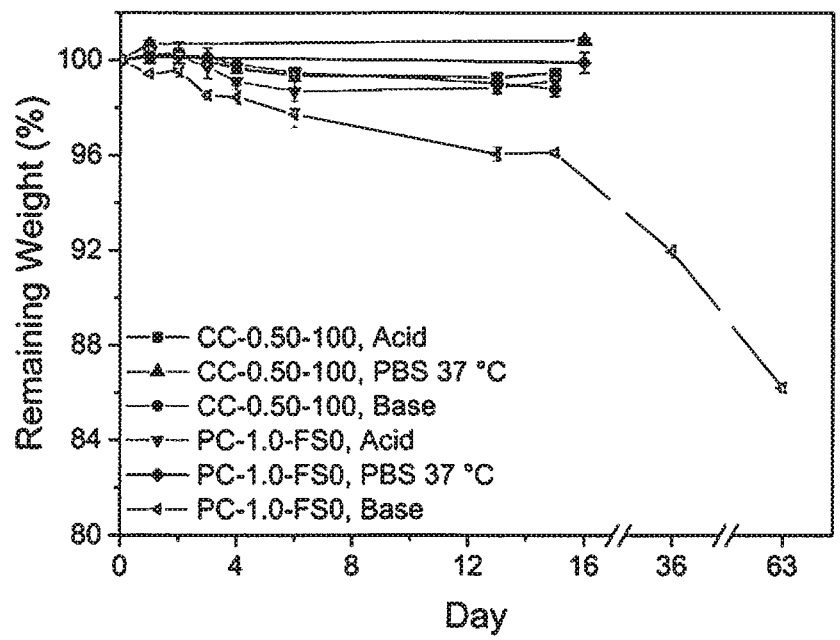
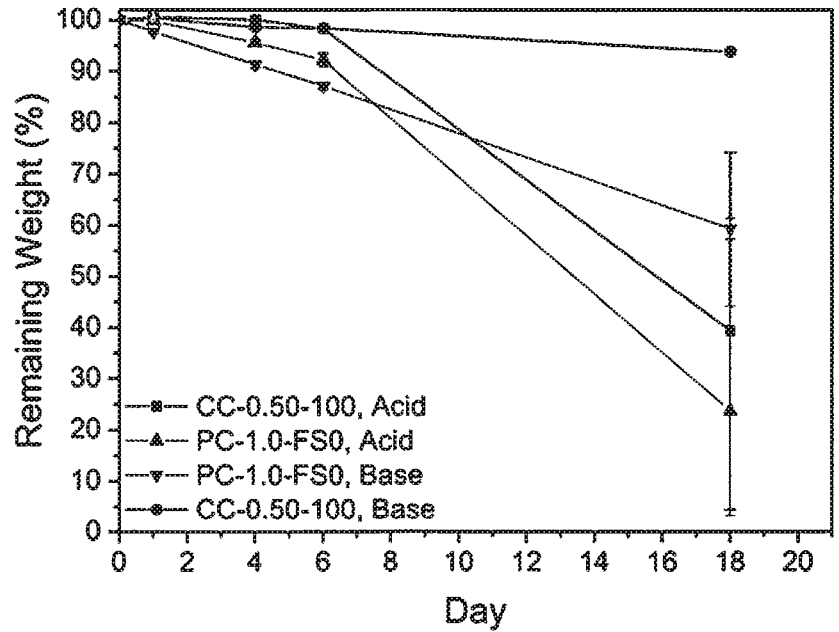

METHODS FOR MAKING RENEWABLE AND CHEMICALLY RECYCLABLE CROSSLINKED POLYESTER ELASTOMERS

This application claims the benefit of U.S. Provisional Application No. 62/398,894, filed Sep. 23, 2016, entitled, "METHODS FOR MAKING RENEWABLE AND CHEMICALLY RECYCLABLE CROSSLINKED POLYESTER ELASTOMERS," the entire content of which is incorporated hereing by reference in its entirety

STATEMENT REGARDING FEDERALLY SPONSORED RESEARCH OR DEVELOPMENT

This invention was made with government support under CHE-1413862 awarded by the National Science Foundation. The government has certain rights in the invention.

BACKGROUND

Crosslinked polymers (CPs) encompass almost a third of the synthetic polymer industry and are important in a wide variety of products including tires, contact lenses, elastomers, adhesives, and foams. While crosslinking confers a number of advantages, including high thermal stability and solvent resistance, this crosslinked structure also prevents CPs from being reprocessed. Postconsumer CPs are consequentially disposed of in landfills or by incineration, leading to significant loss of value. Additionally, the vast majority of synthetic polymers—including CPs—are petroleum-derived and difficult to renew or degrade. The undesirable environmental impact of the production and disposal of CPs has led to the development of CPs that are recyclable, some of which are also renewable.

For example, biodegradable aliphatic polyesters have been made to produce thermoplastic elastomers. However, these materials can have undesirable properties such as poor solvent resistance and low thermal stability, and can exhibit significant stress softening (known as the Mullins effect). In addition, rigorous reaction conditions are required to produce thermoplastic elastomers based on biodegradable aliphatic polyesters.

SUMMARY

In general, the present disclosure is directed to biodegradable and renewable crosslinked elastomers obtained from polymerization and crosslinking of lactones. In various embodiments, the crosslinked polylactone elastomers were obtained by tandem copolymerization/crosslinking of a lactone monomer with a cyclic carbonate, or cross-linking a linear lactone homopolymer with a free-radical generator. In some embodiments, the lactone monomers or homopolymers were obtained from renewable sources.

In some embodiments the crosslinked polylactone elastomers described in this disclosure exhibited excellent mechanical properties such as, for example, a $T_g$ greater than about $-52°$ C. and $M_e=4.3$ kg $mol^{-1}$, and could be easily compounded with fillers to enhance performance without significant loss of elasticity. In various embodiments, the polylactone elastomers can be produced renewably on a large scale and can be polymerized in bulk for use in a wide range of applications such as, for example, tough plastics, thermoplastic elastomers, soft polyurethane foams, and the like.

In some embodiments, the crosslinked polylactone elastomers of this disclosure can be chemically recycled by depolymerizing to yield lactone monomer in high purity and yield of greater than about 80%, or even greater than about 90%, and are readily degradable under moderate conditions.

In one aspect, the present disclosure is directed to a method including reacting a polymer derived from a lactone with a cyclic carbonate compound comprising 2 to 5 cyclic carbonate moieties and a catalyst to form a crosslinked polylactone elastomer.

In another aspect, the present disclosure is directed a method including reacting a lactone with a catalyst including a guanidyl moiety to form a lactone polymer, and reacting the lactone polymer with a free-radical initiator to form a crosslinked polylactone elastomer.

In another aspect, the present disclosure is directed to method including extruding a composition comprising a poly(lactone) homopolymer, about 1 wt % to about 5 wt % of a free radical initiator, and about 5 wt % to about 50 wt % of a filler to produce an elastomeric composite.

In another aspect, the present disclosure is directed a method including reacting an alkyl diol with a first catalyst to produce a lactone monomer; reacting a polymer derived from the lactone monomer with a cyclic carbonate compound including 2 to 5 cyclic carbonate moieties and second catalyst comprising a guanidyl moiety to form a crosslinked polylactone elastomer; and reacting the polylactone elastomer with a polyol and a third catalyst to depolymerize the polylactone and recover at least 90% of the lactone monomer.

In another aspect, the present disclosure is directed an elastomeric composite including a filler and a polylactone elastomer derived from reacting a polymer derived from an alkyl-substituted lactone with a cyclic carbonate compound including 2 to 5 cyclic carbonate moieties, a catalyst including a guanidyl moiety, and an initiator compound including an aromatic diol.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4A is a plot of representative tensile data for PC elastomers and a commercially available generic rubber band.

FIG. 4B is a plot of tensile data for PC-FS composites prepared with 2 wt % BPO relative to the mass of PMVL.

FIG. 5A is a plot of the results of a degradation study of CC-0.50-100 and PC-2.0-FS0 in aqueous PBS (37° C.), 1 M hydrochloric acid (aqueous), and 1 M sodium hydroxide (aqueous) at room temperature.

FIG. 5B is a plot of the results of a degradation study of CC-0.50-100 and PC-2.0-FS0 in aqueous PBS (37° C.), 1 M hydrochloric acid (aqueous), and 1 M sodium hydroxide (aqueous) at 60° C.

DETAILED DESCRIPTION

Figures 1A, 1B:
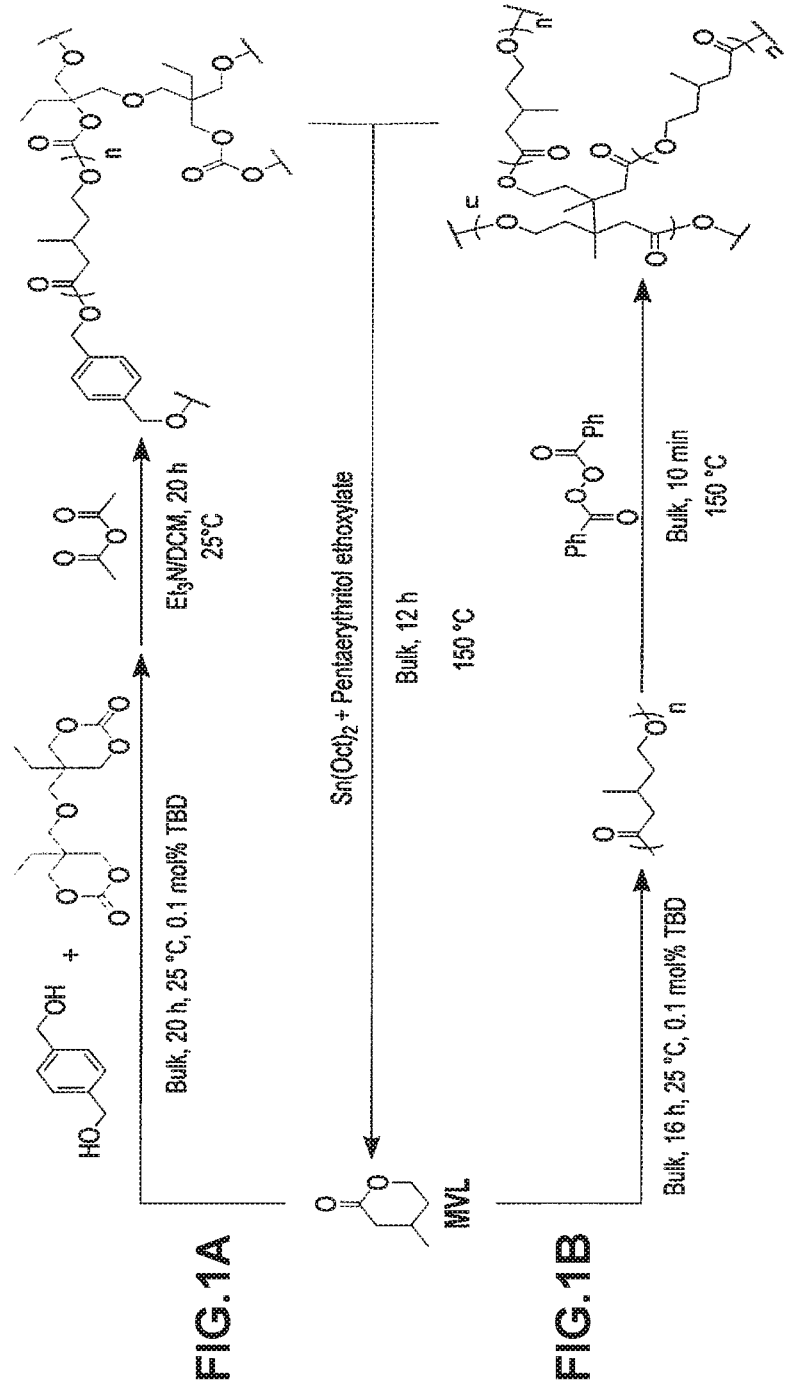
FIGS. 1A and 1B are schematic diagrams of representative embodiments of two reaction schemes for producing a crosslinked polylactone elastomer according to the present disclosure.

In one embodiment, the present disclosure is directed to a method in which a polymer derived from a lactone monomer is copolymerized and crosslinked with: (1) a cyclic carbonate with 2 to 5 cyclic carbonate moieties; and (2) a catalyst; to form a crosslinked poly(lactone) elastomer.

The lactone utilized in this method may vary widely, and may include any cyclic ester with a formula R—C═OOR', wherein R and R' are alkyl or aryl. In various embodiments, suitable lactones include with two or more carbon atoms, and a ring structure including at least 4 ring members. In some embodiments, the lactones include a 5 membered γ-lactone or a 6 membered β-lactone.

In various embodiments the lactone may be alkyl-substituted, with the alkyl substituted on the lactone chosen from methyl, ethyl, propyl, butyl, cyclic alkyls and combinations thereof. In some embodiments, the alkyl group on the lactone is a linear alkyl group such as a methyl group. For example, while not intending to be limiting, suitable lactones include valerolactone, δ-valerolactone, β-methyl-δ-valerolactone, δ-decalactone, δ-dodecalactone, and combinations thereof.

The lactones used in the copolymerization and crosslinking reaction can be obtained from a wide variety of sources, but in some embodiments the lactone monomeric reactants may be produced from sustainable sources such as alcohols. In one example, which is not intended to be limiting, a lactone may be produced by reacting an alkyl diol with a dehydrogenation catalyst to produce a lactone monomer. Suitable dehydrogenation catalysts may vary widely, but ruthenium catalysts and copper chromite have been found to be useful. For example, β-methyl-δ-valerolactone (referred to herein as MVL) may be produced by reacting alkyl polyol is 3-methyl1,5 pentane diol with a copper chromite catalyst.

In the copolymerization and crosslinking reaction, the cyclic carbonate compound is multifunctional, and includes at least two 2 cyclic carbonate moieties. In the present application the term cyclic carbonate moiety includes any cyclic structure with one carbon atom surrounded by 3 oxygen atoms. The ring supporting the carbonate moieties includes 4 to 8 members, and in some embodiments is a six membered ring.

In some embodiments, which are not intended to be limiting, the cyclic carbonate moieties are separated by an ether linkage or an ester linkage, and may be symmetrical about the ether or ester linkages. Non-limiting examples of multifunctional cyclic carbonates may be found in Al-Azemi et al., *Synthesis of novel bis-and tris-(cyclic carbonate)s and their use in preparation of polymer networks*, Polymer, vol. 43, issue 8, April 2002, at 2161-2167. For example, suitable cyclic carbonate moieties include bis 6 membered cyclic carbonates that are symmetrical about an ether linkage, such as 5,5'-(oxybis(methylene))bis(5-ethyl-1,3-dioxan-2-one).

In various embodiments, the amount of the cyclic carbonate is about 0.1 mol % to about 5 mol %, or about 0.25 mol % to 2 mol %, with respect to the amount of the lactone in the reaction.

The catalyst selected for the copolymerization and crosslinking reaction may vary widely, and any catalyst suitable for ring opening transesterification at moderate temperatures or room temperature can be used. Non-limiting examples include, diphenyl phosphoric acid, hydrochloric acid, diethyl zinc, triflic acid, phosphoric acid, sulfuric acid, diazabicycloundecene, dimethylaminopyridine, guanidine, triethyl aluminum, metal isopropoxides based on aluminum or titanium, and mixtures and combinations thereof. In some embodiments, the catalyst includes a compound with a guanidyl moiety $(H_2N)_2C$═NH. In some embodiments, the catalyst is selected from a cyclic compound or a bicyclic compound including the guanidyl functional group. The guanidyl functional group-containing compounds are string bases that can be used for ring-opening polymerizations of lactones. In some embodiments, which are not intended to be limiting, the catalyst includes a bicyclic compound such as triazabicyclodecene (1,5,7-triazabicyclodec-5-ene (TBD)).

In various embodiments, the catalyst is present at about 0.01 mol % to about 1 mol %, or about 0.05 mol % to about 0.5 mol %, or at 0.1 mol %, with respect to the amount of lactone in the reaction.

In some embodiments, the copolymerization and crosslinking reaction further includes an optional initiator compound. The initiator compound may vary widely, and suitable examples include, but are not limited to, hydroxyl-functional compounds, primary amines, secondary amines, and mixtures and combinations thereof. In various embodiments, the hydroxyl-functional initiator compound includes a single hydroxyl moiety, two hydroxyl moieties, or more than two hydroxyl moieties. In some embodiments, the hydroxyl-functional initiator compound is an alcohol, or may be selected from aromatic diols. Suitable examples include, but are not limited to, compounds such as methanol and benzene dimethanol.

In various embodiments, as shown schematically in the reaction scheme of FIG. 1A, the crosslinked polylactone elastomer product of the copolymerization and crosslinking reaction includes first linear monomeric units derived from the initiator compound, second linear monomeric units derived from the lactone, and third branched monomeric units derived from the cyclic carbonate compound. The first monomeric units are connected to the second monomeric units via an ether linkage and the second monomeric units are connected to the third monomeric units via an ester linkage.

In various embodiments, the second monomeric units derived from the lactone provide a chain or strand-like structure, while the connection points between the strands are formed by the first and third monomeric units derived from the initiator compound and the cyclic carbonate, respectively.

In another embodiment, the crosslinked polylactone elastomer product, which is typically in the form of a thin film, is further reacted to convert hydroxyl end groups thereon to acetate groups, and to remove impurities such as unreacted monomer, catalyst and initiator. For example, the hydroxyl end groups on the polylactone elastomer can be converted to acetate groups by exposing the elastomer to a reaction mixture including acetic anhydride and an amine at or near room temperature. The product of the reaction between the elastomer and the acetic anhydride and amine reaction mixture can then optionally be heated to about 80° C. to about 90° C. under vacuum to remove excess monomer without causing depolymerization. After heating under vacuum, the elastomeric product is substantially odorless.

In some embodiments, this end-capping strategy also increases the decomposition temperature of the polylactone polymers by 10-15° C. when compared with samples in which the catalyst was deactivated by exposure to air. While not wishing to be bound by any theory, presently available evidence indicates that the significant increase in the decomposition temperature of the treated polylactone reaction product can be attributed to the lack of residual hydroxyl groups, which are required for depolymerization of the polylactone to occur via an "unzipping" mechanism.

The amine used in the end capping treatment step may vary widely, but tertiary amines such as triethylamine have been found to work well.

In another embodiment, the polylactone elastomer may be produced by a sequential approach in which a lactone is first reacted with the catalysts described above including a guanidyl moiety to open the lactone and produce a substantially linear lactone-derived homopolymer therefrom. The linear homopolymer derived from the ring-opening reaction of the lactone with the catalyst may then be reacted at the same or a subsequent time with a free-radical initiator to form a crosslinked polylactone elastomer.

In various embodiments, which are not intended to be limiting, the free-radical initiator is chosen from peroxides and azo compounds. Suitable examples include organic peroxides such as benzoyl peroxide, dicumyl peroxide, t-butyl peroxide, carbamide peroxide, acetone peroxide, methyl ethyl ketone peroxide, diacetyl peroxide, and mixtures and combinations thereof. Suitable initiators also may include organic radical azo initiators such as TEMPO ((2,2,6,6-tetramethylpiperidin-1-yl)oxyl or (2,2,6,6-tetramethylpiperidin-1-yl)oxidanyl)) based compounds, azobisisobutyronitrile (AlBN), and mixtures and combinations thereof.

In some embodiments, the free-radical initiator may include a photoinitiator. Suitable examples include, but are not limited to, 2,2-dimethoxy-2-phenylacetophenone, camphorquinone-amines, azobisisobutyronitrile (AlBN), organic peroxides, and mixtures and combinations thereof.

In some embodiments, the free-radical initiator may optionally be supplied in a suitable solvent such as, for example, dichloromethane (DCM), tetrahydrofuran (THF), methanol, and the like.

The polymer crosslinking reaction can take place under a wide variety of conditions. In some embodiments the components can be loaded into an extruder maintained at about 50° C. to about 100° C., or may be polymerized in a bulk reactor at about 100° C. to about 200° C. In other embodiments, the polymer crosslinking reaction can be photoinitiated by exposing the monomeric components to, for example, ultraviolet (UV) light.

Referring again to the reaction scheme in FIG. 1B, in some embodiments the crosslinked polylacatone elastomer includes linear monomeric units linked end to end, as well as linear monomeric units branching from, from example, various locations along the backbone of linear monomeric units in along the polymer chain, or from the alkyl group on the backbone. In various embodiments, which are not intended to be limiting, the molar mass of the polymer product of the reaction scheme of FIG. 1B is greater than about 50 kg/mol, or greater than about 100 kg/mol, or greater than about 500 kg/mol.

As noted above, a crosslinked polylactone elastomer produced by either of the above synthetic routes may be readily depolymerized by reacting the elastomer with a polyol and a suitable Lewis acid catalyst to depolymerize the polylactone and recover at least 90%, or at least 91%, or at least 93%, or at least 95%, or at least 99%, of the lactone reactant. In one example, which is not intended to be limiting, the polylactone elastomer may be exposed to a solution including a polyol and catalyst including Sn(II), Sn(IV) and combinations thereof, such as stannous (tin (II)) octoate, dibutyl tin (IV) octoate, and combinations thereof. However, other catalysts such as, for example, those containing Zn(II) such as zinc acetate, zinc acetylacetonate, or zinc octoate, rare earth metal triflate catalysts involving Sc, Yb, Y, Eu, Gd, and the like, aluminum catalysts such as aluminum ethoxide or triethyl aluminum, basic catalysts involving amines, such as triethylamine, triazabicyclodecene, diazabicycloundecene, dimethylaminopyridine, and other guanidine type bases, as well as strong acid catalysts such as sulfuric acid, phosphoric acid, hydrochloric acid, triflic acid, and the like.

In various embodiments, the polyol used in the depolymerization of the crosslinked polylactone elastomers may vary widely, but polyols such as erythritol have been found to work well, particularly pentaerythritol ethoxylate.

The crosslinked polylactone elastomers also degrade under moderate conditions upon exposure to a mild acidic or basic aqueous medium and form molecules that can easily be assimilated into the environment. For example, the crosslinked polylactone elastomers degrade readily at about 60° C. in 1 M acidic or 1 M basic solutions.

The crosslinked polylactone elastomer is rubbery like a conventional petroleum-derived elastomer or vulcanized natural rubber, and in some embodiments is sufficiently elastic to be stretched, twisted, or compressed like a rubber band or a soft foam. Articles formed from the crosslinked polylactone elastomer exhibit hysteresis, and are sufficiently elastic to recover their original shape after large deformations.

In other embodiments, depending in part on the amount of crosslinker and other additives included in the composition, the polylactone elastomer can have properties similar to a hard and tough plastic material. In some embodiments, the crosslinked polylactone elastomers have excellent chemical and mechanical properties like other amorphous polyester elastomers such as, for example, stress of about 3 MPa to about 12 MPa, or up to about 21 MPa to about 50 MPa with reinforcing fillers, a strain of about 250% to about 1750%, a $T_g$ of greater than about −52° C., or greater than about −50° C., or greater than about −49° C., or greater than about −48° C. The crosslinked polylactone elastomers can be used in, for example, tires, adhesives and foams like conventional crosslinked polyesters derived from petroleum.

In some embodiments, the properties of the crosslinked polylactone elastomers derived from either of the synthetic approaches detailed above may be modified by the addition of a wide variety of fillers to form an elastomeric composite. In various embodiments, which are not intended to be limiting, suitable fillers include carbon blacks, silicas (fumed silica, etc.), starches, cellulose and other fibers, clay, calcium carbonate, talc, oxides such as zinc or titanium oxides, wood flour and saw dust, mica and other minerals, and mixtures and combinations thereof. In some embodiments, the filler includes silica, fumed silica, and mixtures and combinations thereof.

In various embodiments, the filler is present in the elastomeric composite at about 5 wt % to about 50 wt %, or about 10 wt % to about 40 wt %, or about 10 wt % to about 30 wt %.

The fillers may be incorporated into the crosslinked polylactone elastomer to form the elastomeric composite at any point in the preparation methods described above, but in some non-limiting embodiments the linear lactone-derived homopolymer produced by the sequential synthesis technique above may be combined with about 1 wt % to about 5 wt % of a free radical initiator such as a peroxide, and about 5 wt % to about 50 wt % of a filler such as silica or fumed silica to form an extrudable composition that can be processed in an extruder to produce an elastomeric composite. In another embodiment, an extrudable composition may optionally further include an alkyl substituted lactone, a catalyst, and a free-radical initiator, which may be processed in an extruder to form a crosslinked polylactone elastomer.

In various embodiments, which are not intended to be limiting, the extruder is maintained at a temperature of about 40° C. to about 100° C., or about 50° C. to about 80° C. The extrudate can then be molded or otherwise processed to produce a finished elastomeric composite.

The invention will now be further described with reference to the following non-limiting examples.

EXAMPLES

Materials

All reagents were purchased from Sigma-Aldrich (Milwaukee, Wis.) and were used as received unless otherwise stated.

1,5,7-triazabicyclodec-5-ene (TBD) was purified by vacuum sublimation (70° C., 30 mTorr).

Dichloromethane (DCM), tetrahydrofuran (THF), and methanol were purchased from Fisher Scientific (Hampton, N.H.); DCM and THF were purified via a GC-SPS-4-CM glass contour 800-L solvent purification system obtained from Pure Process Technologies (Nashua, N.H.).

3-Methyl-1,5-pentanediol was obtained from TCI (Portland, Oreg.) and used without further purification.

β-methyl-δ-valerolactone (MVL) was produced by one of two methods as described in previous studies and purified by three fractional distillations over calcium hydride (72° C., 1 Torr).

4,4,5,5'-(oxybis(methylene))bis(5-ethyl-1,3-dioxan-2-one) (B6CC), a bis(6-membered cyclic carbonate) was also produced as described in, for example, Fortman, et al., *Mechanically Activated, Catalyst-Free Polyhydroxyurethane Vitrimers*, J. Am. Chem. Soc., 2015, 137 (44), 14019-14022; and Yang, et al., *Biodegradable cross-linked poly(trimethylene carbonate) networks for implant applications: Synthesis and Properties*, Polymer, vol. 54, Issue 11, 9 May 2013, 2668-2675. The B6CC was recrystallized three times from THF.

A fumed silica available under the trade designation Aerosil R 812 was provided by Evonik Industries (Parsippany, N.J.).

Rubber bands manufactured in Thailand for Universal® (Deerfield, Ill.).

All glassware was heated to 105° C. overnight prior to use.

Characterization Methods $^1$H-NMR spectroscopy was performed on a 500 MHz Bruker Avance III HD with SampleXpress spectrometer (Billerica, Mass.). Solutions were prepared in 99.8% CDCl$_3$ (Cambridge Isotope Laboratories). All spectra were acquired at 20° C. with 64 scans and a 2 s delay. Chemical shifts are reported in ppm with respect to CHCl$_3$ (7.26 ppm).

Uniaxial tensile testing and hysteresis measurements were conducted using dog bone-shaped tensile bars (ca. 0.5 mm (T)×3 mm (W)×25 mm (L) and a gauge length of 14 mm for PC samples or 0.5 mm (T)×5 mm×38 mm (L) and a gauge length of 22 mm for CC samples). The samples were aged for 48 hours at 25° C. in a desiccator prior to testing. Tensile measurements were performed on a Shimadzu Autograph AGS-X Series tensile tester (Columbia, Md.) at 25° C. with a uniaxial extension rate of 50 mm min$^{-1}$. Young's modulus (E) values were calculated using the Trapezium software by taking the slope of the stress-strain curve from 0 to 10% strain. Reported values are the average and standard deviations of five replicates from the same sample. Twenty cycles were performed during hysteresis measurements to 67% strain at 50 mm min$^{-1}$ and the energy loss was calculated by subtracting the area under the curve of the contraction from the area under the curve of the extension in each cycle. The residual strain was taken as the point at which the return cycle reached its minimum stress. All graphical representation of hysteresis data was smoothed using a 100-point adjacent-averaging smoothing function in Origin® data analysis software in order to remove noise.

Dynamic mechanical thermal analysis (DMTA) was performed on a TA Instruments RSA-G2 analyzer (New Castle, Del.) using dog bone shape films (ca. 0.5 mm (T)×3 mm (W)×25 mm (L) and a gauge length of 14 mm). DMTA experiments were conducted in tension film mode, where the axial force was first adjusted to 0.2 N of tension (sensitivity of 0.01 N) to ensure no buckling of the sample. The proportional force mode was set to force tracking to ensure that the axial force was at least 100% greater than the dynamic oscillatory force. The strain adjust was then set to 30% with a minimum strain of 0.05%, a maximum strain of 5%, and a maximum force of 0.2 N in order to prevent the sample from going out of the specified strain range. A temperature ramp was then performed from −70° C. to 200° C. at a rate of 5° C. min$^{-1}$, with an oscillating strain of 0.05% and an angular frequency of 6.28 rad s$^{-1}$. The T$_g$ was calculated from the maximum value of the loss modulus. The effective molar mass between cross-links (M$_{x,eff}$), which consists of contributions from cross-links and entanglements, was calculated using the storage modulus (E') at 25° C. and equation 1.

$$E'(T) = 3G'(T) = 3RT\nu_e = \frac{3\rho RT}{M_{x,eff}} \quad (1)$$

Where E' and G' are the storage and shear modulus respectively, R is the universal gas constant, T refers to the absolute temperature in the rubbery region (ca. 298 K) and ρ is the density of PMVL (ca. 1.1 g cm$^{-3}$).

Differential scanning calorimetry (DSC) was conducted on a TA Instruments Discovery DSC (New Castle, Del.). The instrument was calibrated using an indium standard. All samples were prepared using T-Zero hermetic pans (ca. 5 mg) under a N2 purge of 50 mL min$^{-1}$. The samples were initially cooled to −80° C. and then heated to 100° C. at 10° C. min$^{-1}$. The samples were then cooled back to −80° C. at 10° C. min$^{-1}$ and heated again to 100° C. at the same rate. Values for T$_g$ were acquired at the mid-point of each transition in the second heating curve using the Trios® software. Thermogravimetric analysis (TGA) was performed on a TA Instruments Q500 (New Castle, Del.) under air at a heating rate of 10° C./min to 550° C. A typical sample size was between 8-15 mg.

Solvent extraction experiments were performed by placing a small amount of cross-linked polymer (ca. 20 to 100 mg) into a 20-mL vial filled with DCM. The vial was then closed and stirred for 48 h before removing the solvent by gravity filtration. The recovered sample was dried under reduced pressure for 48 h at 20 mTorr, after which the sample was weighed and the gel percent was determined.

The hydrolytic degradation of the elastomers was investigated in accelerated conditions using 1 M aqueous solutions of NaOH or HCl at 60° C. as well as in biologically relevant conditions by using an aqueous phosphate-buffered saline (pH=7.4) solution at 37° C. Nine replicates of each cross-linked polymer sample were prepared (50 mg each). The replicates were immersed in triplicate in the aforementioned aqueous solutions in separate 20-mL scintillation vials and heated to their respective temperatures. The insoluble mass was recorded after removing each sample from the solution and patting it dry with a paper wipe, after which the sample was re-immersed in the same solution. Solutions were checked weekly with litmus paper to ensure their pH remained stable; none of the solutions showed pH variance by this method. The data presented in the plots of insoluble mass % (percentage of original mass) over time includes the averages and standard deviations of the triplicate samples in their respective medium.

Refractive index size exclusion chromatography (RI-SEC) was performed on an HP/Agilent 1100 series SEC at 35° C. using three successive PLgel Mixed C Columns and a PLgel 5 μm guard column with an HP 1047A RI detector (Santa Clara, Calif.). CHCl$_3$ was used as the mobile phase with an elution rate of 1 mL min$^{-1}$. The $M_n$ and D were determined based on a 10-point calibration curve using polystyrene standards purchased under the trade designation EasiCal from Agilent Technologies, Santa Clara, Calif.

Example 1—Modified Synthesis of MVL from 3-methyl-1,5-pentanediol

3-Methyl-1,5-pentanediol (1 L, 974 g, 8.24 mol) and copper chromite (50 g, 0.16 mol, 2 mol %) were charged into a 2-L 3-neck round bottom flask fitted with a Dean-Stark apparatus, a thermometer, and a glass stopper. The apparatus was then attached to a bubbler filled with silicon oil. A heating mantle was used to heat the round bottom flask to 240° C. under vigorous stirring. The temperature of the reaction rapidly rose to 170° C., followed by collection of water (ca. 5 mL) and an unknown organic liquid (ca. 5 mL).

Following removal of these impurities, the reaction temperature rose rapidly to ca. 210-220° C. followed by evolution of H2 gas. The reaction was allowed to continue for 20 h and then cooled. At this time the 1H-NMR spectrum of the solution indicated ca. 95% conversion of the diol. The crude product, a mixture of MVL monomer and PMVL polymer, was then purified by fractional distillation under reduced pressure.

First, a forerun was removed (1 Torr, 55-72° C., 50 g) followed by a second fraction (1 Torr, 72-75° C., 850 g). The higher boiling fraction was a clear, colorless liquid containing a minor amount of 4-methyl-3,4,5,6-tetrahydro-2H-pyran-2-ol. The concentration of this impurity in MVL was estimated to be ~0.2 mol % using the 1H-NMR signal corresponding to the methine proton at δ5.3 ppm.

To remove the lactol, the crude MVL was stirred with phosphorous pentoxide (5 g) at 120° C. for 12 h; this resulted in the dehydration of the lactol impurity and polymerization of the MVL (~60% conversion of MVL was observed) presumably with water or lactol as the initiating species. The solution of polymer in monomer was then distilled under the conditions previously described until ca. 10% of the liquid remained in the pot.

Analysis of the resulting MVL via 1H-NMR spectroscopy indicated that it no longer contained any lactol impurity, within the detection limit of the instrument used. To obtain high purity monomer, the MVL was then distilled two more times under reduced pressure from calcium hydride, each time discarding the first 5% of distillation liquid, to yield a clear a colorless liquid (65-75% yield).

To evaluate the monomer purity, test polymerizations were conducted in the bulk at room temperature using 0.1 mol % TBD as a catalyst. The molar mass of the resultant polymer is expected to depend on the concentration of adventitious initiators. For this work the MVL was classified as low purity if polymerization results in PMVL with $M_n$<100 kg/mol, moderate purity if $M_n$>100 kg/mol, and high purity if $M_n$>200 kg/mol. The copper chromite residue after the first distillation has been used in up to four successive reactions without significant/noticeable decreased in activity.

$^1$H-NMR (500 MHz, CDCl$_3$; 25° C.): δ(ppm)=4.40; [m, —O—CH2—CH2—, 1H], 4.25; [m, —O—CH2—CH2—, 1H], 2.66; [m, —CO—CH2—CH(CH3)—, 1H], 2.20; [m, —CO—CH2—CH(CH3)—, 1H], 2.03-2.13; [m, CO—CH2—CH(CH3)—CH2— and —CO—CH2—CH(CH3)—, 2H], 1.9; [m, —CH(CH3)—CH2—CH2—O, 1H], 1.55; [m, —CH(CH3)—CH2—CH2—, 1H], 1.05; [d, —CH2—CH(CH3)—CH2—, 3H].

Example 2—Synthesis of a Cyclic Carbonate Crosslinked PMVL (CC)

PMVL elastomers were first synthesized using a tandem methodology (Scheme A in FIG. 1A). A bis(6-membered cyclic carbonate) was chosen as a cross-linker due to its high solubility in neat MVL, and also because it was anticipated that MVL and B6CC would have similar reactivity. The equilibrium monomer concentration of MVL is 90% at room temperature, thus residual monomer was removed post-polymerization prior to testing the material properties.

Under a nitrogen atmosphere, MVL (7.00 g, 61.4 mmol, high purity) was charged into a 20-mL scintillation vial along with varying amounts of B6CC (46 to 371 mg, 0.15 to 1.23 mmol, 0.25 to 2 mol % to MVL) and 1,4-benzenedimethanol (BDM, 0 to 19 mg, 0 to 0.14 mmol). The mixture was stirred until completely homogenous, then a solution of TBD in DCM (100 mg/mL, 85 μL solution, TBD=0.1 mol % relative to MVL) was injected using a gastight syringe. The polymerization solution was allowed to stir for ca.10 s and then poured into a Pyrex® petri dish (inner diameter=90 mm). The contents of petri dish were allowed to cure overnight at room temperature under nitrogen (ca. 20 h) to ensure maximum conversion.

The resulting elastomer was then removed from the dish and a 1 M solution of acetic anhydride and triethylamine in DCM (0.35 to 1.40 mL, ca. 5 eq relative to hydroxyl moieties or TBD if no BDM was used) was dripped over the top of the film via a syringe. The elastomer was allowed to sit in air for another 20 h and then placed in an oven under reduced pressure at 80-90° C. for 48 h to remove DCM, acetic anhydride, triethylamine, and residual MVL monomer.

This process produced a clear, colorless, and odorless cross-linked poly(β-methyl-δ-valerolactone) (PMVL) film (88 to 91% mass yield). Samples prepared using this method are named as CC-X-Y, where X and Y represent the mol % B6CC and the theoretical molar mass (kg mol$^{-1}$) if no cross-linking were to occur, respectively. For example, a sample with 1.00 mol % B6CC and a theoretical molar mass of 100 kg/mol based on the amount of BDM added (assuming 100% monomer conversion) would be denoted CC-1.00-100.

As PMVL is able to depolymerize in the presence of catalyst, a variety of methodologies were considered to deactivate TBD so that any residual monomer could be removed under reduced pressure and the material could operate at elevated temperatures without uncontrollable depolymerization. Guanidine-based organocatalysts are most commonly deactivated using a large excess of benzoic acid, yet it was observed that the excess benzoic acid sublimed under vacuum and that the films depolymerized in these conditions.

While not wishing to be bound by any theory, presently available evidence indicates that there remained an acid adduct of TBD that was capable of depolymerizing PMVL, as similar acid adducts of organocatalysts are capable of transesterification. Additionally, deactivation of TBD through exposure to air generally took up to two weeks at ambient conditions, suggesting that diffusion of oxygen and carbon dioxide into the polymer is slow.

Therefore, a method was developed to convert the hydroxyl end-groups of PMVL to acetate groups, and it was anticipated that acetylation chemistries would also deactivate the residual TBD. To accomplish this, a solution of acetic anhydride and triethylamine in DCM (5 equivalents with respect to hydroxyl moieties or TBD if no added initiator was added) was applied to the surface of the film. After allowing the solution to diffuse through the film for 20 h, the material was subjected to reduced pressure to remove residual monomer. It was found that this could be accomplished with mild heating (80 to 90° C.) without significant depolymerization. It was observed that this end-capping strategy also increased the decomposition temperature of the polymers by 10-15° C. when compared with CC samples in which the TBD was deactivated with two weeks of air exposure.

While not wishing to be bound by any theory, presently available evidence indicates that the significant increase in the decomposition temperature can be attributed to the lack of hydroxyl groups, which are required for depolymerization of PMVL to occur via an "unzipping" mechanism. The amount of cross-linker did not appear to affect the mass recovery after excess monomer removal, nor was there a significant difference in their decomposition temperatures.

Once the monomer removal protocol was established, two sets of CC samples were investigated. At a fixed ratio of MVL to added BDM initiator (specifically, 876:1), first the concentration of B6CC was varied from 0.25 to 2.0 mol % relative to MVL. All of the materials with B6CC concentrations greater than or equal to 0.25 mol % gelled within 10 min. To ensure conversion of MVL monomer reached equilibrium, the films were allowed to cure overnight (ca. 20 h). After monomer removal, extraction experiments revealed high gel percentages that increased slightly with cross-linker content (Table 1 below).

Next, the ratio of MVL to B6CC (specifically at 100:1) was fixed and the amount of added initiator was varied. No clear trend in gel percentage was observed when the concentration of initiator was varied. Furthermore, the $T_g$ of all the materials was between −47 and −49° C. compared to −52° C. for PMVL homopolymer, implying that the molecular structure and amount of cross-linker did not significantly contribute to the thermal properties of the material. These results are summarized in Table 1, below.

TABLE 1

Tandem Cross-linking of PMVL with B6CC - Example 2

| CC-X-Y[a] | Mass recovery (%)[b] | Gel %[c] | E' at 25° C. (MPa) | $M_{x,eff}$ (kg mol$^{-1}$)[d] | $M_{x,theo}$ (kg mol$^{-1}$)[e] | $T_{g\,DMTA}$ (° C.)[f] | $T_{g\,DSC}$ (° C.)[h] | $T_d$ (° C.)[i] |
|---|---|---|---|---|---|---|---|---|
| CC-0.25-100 | 88 | 89 | 1.2 | 6.8 | 40 | −49 | −48 | 274 |
| CC-0.50-100 | 91 | 95 | 1.8 | 4.5 | 21 | −48 | −48 | 262 |
| CC-0.75-100 | 89 | 98 | 1.9 | 4.3 | 13 | −48 | −47 | 266 |
| CC-1.0-100 | 89 | 99 | 2.1 | 3.9 | 10 | −48 | −48 | 269 |
| CC-2.0-100 | 89 | 100 | 2.7 | 3.0 | 5.1 | −47 | −46 | 269 |
| CC-1.0-NI[g] | 76 | 98 | 2.8 | 2.9 | 10 | −47 | −47 | 268 |
| CC-1.0-50 | 88 | 97 | 1.8 | 4.5 | 10 | −48 | −47 | 262 |
| CC-1.0-75 | 89 | 96 | 1.6 | 5.1 | 10 | −48 | −47 | 263 |
| CC-1.0-150 | 89 | 99 | 2.2 | 3.7 | 10 | −48 | −47 | 266 |
| CC-1.0-200 | 89 | 100 | 1.7 | 4.8 | 10 | −48 | −47 | 262 |

[a]X = mol % B6CC to MVL and Y = theoretical $M_n$ (kg mol$^{-1}$) assuming no cross-linking were to occur and 100% monomer conversion.
[b]Recovery of mass after heating in a vacuum oven for 48 h at 80° C.
[c]Determined after removing residual monomer.
[d]Determined using E' from DMTA in equation 1.
[e]Calculated by dividing the mass of the polymer recovered by the mol of B6CC and assuming no contribution from entanglements.
[f]Calculated from the maximum of the loss modulus.
[g]NI stands for no initiator; $M_n$ in the presence of no B6CC with high purity monomer is >200 kg mol$^{-1}$ relative to polystyrene standards in RI-SEC with CHCl$_3$ as the mobile phase.
[h]Taken on the second heating ramp at a rate of 10° C. min$^{-1}$.
[i]Taken under air, defined as the temperature at which 5% mass loss is observed.

Figure 2A:
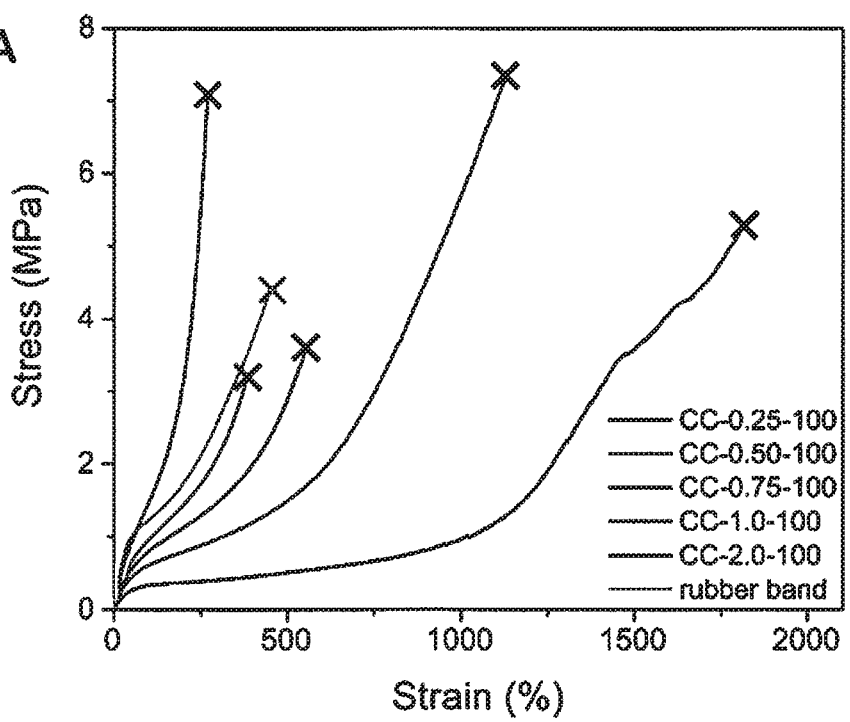
FIG. 2A is a plot of representative tensile data for CC elastomers of Table 1 cross-linked with varying amounts of B6CC and keeping BDM constant.

With the materials in hand, tensile properties of the materials were determined and compared to those of a conventional elastomer, specifically vulcanized natural rubber (generic rubber band, Universal®, Deerfield, Ill.). Remarkably, CC-0.25-100 and CC-0.50-100 both exhibited significantly higher tensile strength and elongation than rubber bands as well as a substantial strain hardening effect (FIG. 2A).

CC-0.75-100 and CC-1.00-100 both showed uniaxial extension properties very similar to that of a rubber band, although their tensile strength drops significantly compared to the samples with lower cross-linker content. A second batch of analogous materials exhibited nearly identical properties, indicating this behavior is reproducible. As expected, increasing the amount of cross-linker resulted in a reduction of the strain at break while slightly increasing Young's modulus. However, there was no clear correlation between cross-linker content and ultimate tensile strength.

Figure 2B:
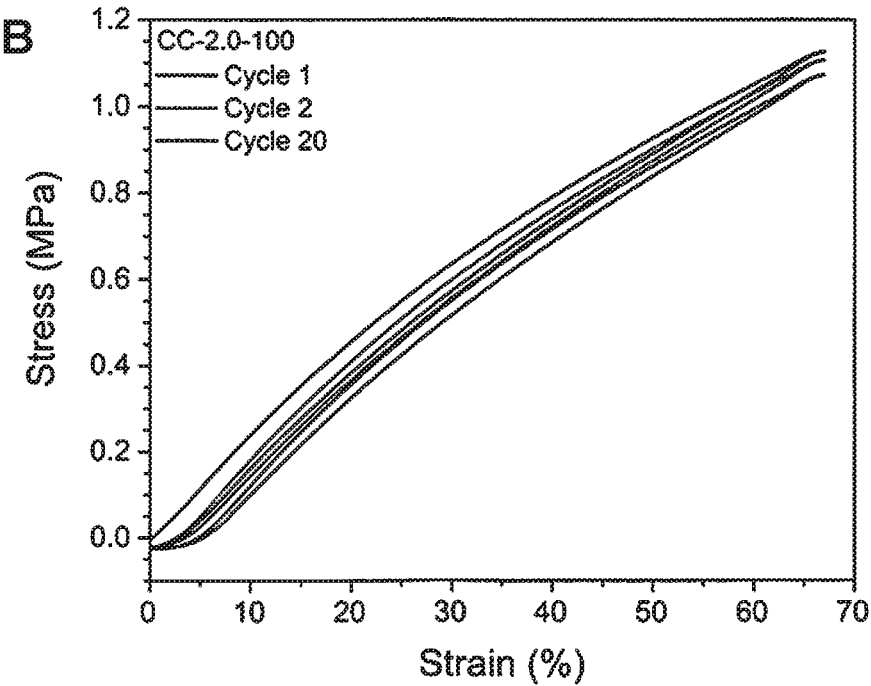
FIG. 2B is a plot of representative hysteresis data for a cross-linked elastomer of Table 1 (CC-1.0-100).

Hysteresis experiments revealed that the energy loss and residual strain per cycle decreased monotonically with 6CC content, with the sample containing 2.0 mol % B6CC exhibiting the least amount of hysteresis loss over 20 cycles (FIG. 2B). The results obtained via DMTA indicated a similar trend in the stiffness of the elastomers; samples with more cross-linker exhibited a higher plateau modulus. Samples with the least amount of cross-linker a slightly negative sloping plateau modulus at temperatures above the $T_g$. While not wishing to be bound by any theory, presently available evidence indicates that this effect is likely due to dangling chain ends as this phenomenon has been seen previously in materials with high levels of this network defect. The effective molar mass between cross-links ($M_{x,eff}$) of the materials was much lower than expected (Table 1); as the $M_e$ of linear PMVL is 4.3 kg/mol, this result is likely due to inherent entanglements contributing to $M_{x,eff}$.

Figure 3:
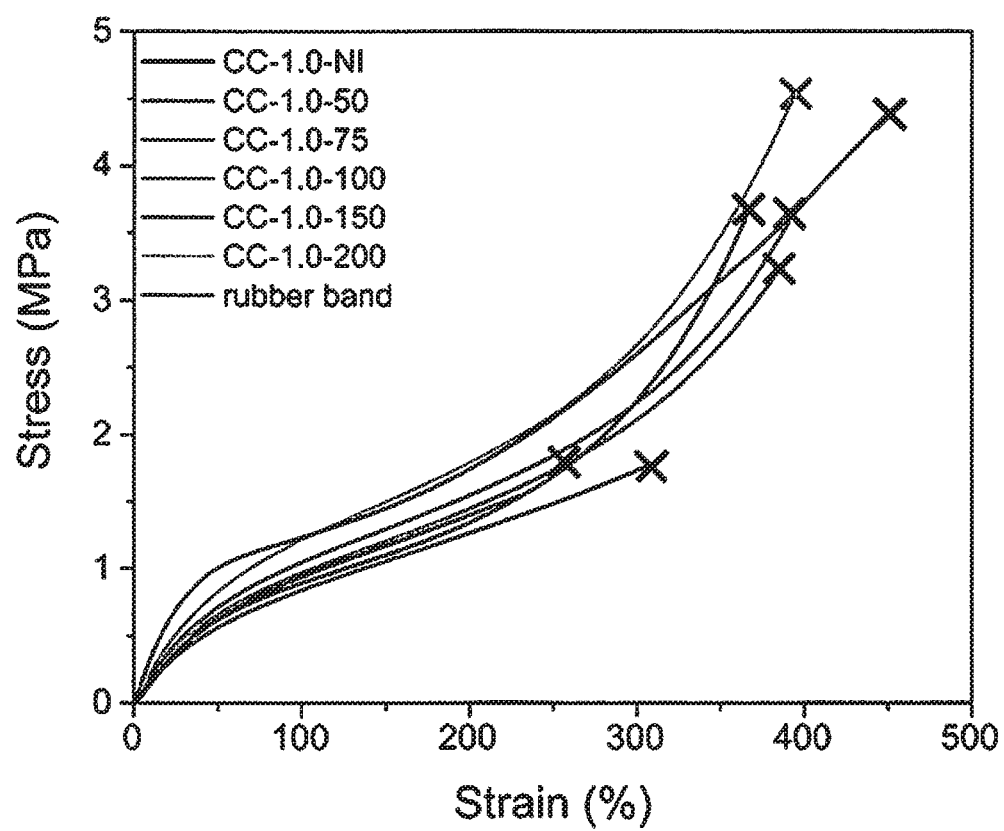
FIG. 3 is a plot of representative tensile data showing the influence of varying amounts of BDM, while keeping B6CC constant, on tensile properties for the materials of Table 1.

A set of materials prepared at fixed 6CC content with varying amounts of initiator was then tested (indicated in the bottom half of Table 1). Uniaxial extension tests revealed that increasing the amount of initiator caused the material to lose significant toughness (FIG. 3), though no significant change in hysteresis loss was observed.

While not wishing to be bound by any theory, presently available evidence indicates that the loss of toughness is due to an increase in network defects from a higher amount of active initiation sites; network defects can cause a significant reduction in mechanical properties because the applied stress will be localized rather than equally divided among the strands in the network. Furthermore, the absence of initiator did not produce a more desirable material, thus, the addition of some initiator is preferred to obtain higher mass recovery after monomer removal high conversion of monomer.

Neglecting the impact of reactivity ratio differences, if the ratio of MVL to BDM is fixed, $M_x$ should increase with a decreasing amount of B6CC in the initial feed because less tetrafunctional junctions will be formed. On the other hand, $M_x$ should not vary significantly if the ratio of MVL to BDM is varied as BDM is difunctional and will not introduce cross-link junctions. Indeed, the plateau modulus and $M_{x,eff}$ increase as the amount of B6CC is decreased, whereas no clear trend is seen when varying the amount of BDM.

Example 3—Synthesis of MVL Homopolymer

Under a nitrogen atmosphere, MVL (100.00 g, 875 mmol, moderate purity) was charged into a 1-L round-bottom flask with a Teflon coated magnetic stir bar. A solution of TBD in DCM (1.22 mL, 100 mg TBD/mL DCM, 0.1 mol % TBD to MVL) was added to the monomer, then the flask was sealed with a rubber septum and the mixture was stirred for 16 hours. Following this, a 1 M benzoic acid solution in DCM was added (9 mL, 10 eq. benzoic acid to TBD) and the polymer solution was diluted with additional DCM to ca. 500 mL. Once the polymer was fully dissolved, the solution was precipitated into methanol (5 L), then dried over a stream of nitrogen for 2 days, dried under vacuum at room temperature for 3 days, and finally dried in an oven under reduced pressure at 60-70° C. for 2 days.

The resulting PMVL was a highly viscous, clear and, colorless (85-88% yield). $^1$H-NMR (500 MHz, CDCl$_3$; 25° C.): δ(ppm)=4.13; [m, —O—CH$_2$—CH$_2$—, 2H], 2.34; [m, —CO—CH$_2$—CH(CH$_3$)—, 1H], 2.20; [m, —CO—CH$_2$—CH(CH$_3$)—, 1H], 2.10; [m, —CH$_2$—CH(CH$_3$)—CH$_2$—, 1H] 1.72; [m, —CH(CH$_3$)—CH$_2$—CH$_2$—, 1H], 1.55; [m, m, —CH(CH$_3$)—CH$_2$—CH$_2$—, 1H], 1.00; [d, —CH$_2$—CH (CH$_3$)—CH$_2$—, 3H]. RI-SEC (CHCl$_3$): $M_n$=162 kg mol$^{-1}$, Đ=1.29. DSC: $T_g$=−52° C. TGA: $T_d$ (5% mass loss, Air)=240° C.

Example 4

In addition to the tandem copolymerization/cross-linking strategy of Example 2, a sequential approach was also applied in which a linear PMVL homopolymer of Example 3 was synthesized and cross-linked using a free radical generator (Scheme in FIG. 1B).

This was accomplished by melt blending linear PMVL with BPO in a twin-screw extruder at 70° C. and curing the extrudate in a press mold at 150° C. The initial molar mass of the PMVL prepolymer ($M_n$=162 kg mol$^{-1}$) was fixed and the mass percent of BPO was varied in the blend. In some cases a filler, Aerosil R 812, a hydrophobic fumed silica, was also added. The characteristics of these samples and blends are summarized in Table 2, below.

TABLE 2

Post Polymerization Cross-linking of PMVL with BPO - Examples 3-4

| PC-Z-FSQ[a] | Gel % | FS (%) | E' at 25° C. (MPa) | $M_{x,eff}$(kg mol$^{-1}$)[b] | $T_{g\ DMTA}$ (° C.)[c] | $T_{g\ DSC}$ (° C.)[d] | $T_d$ (° C.)[e] |
|---|---|---|---|---|---|---|---|
| PC-1.0-FS0 | 76 | 0 | 1.4 | 5.8 | −50 | −50 | 264 |
| PC-2.0-FS0 | 93 | 0 | 1.7 | 4.8 | −49 | −50 | 244 |
| PC-3.0-FS0 | 95 | 0 | 1.8 | 4.5 | −50 | −49 | 246 |
| PC-4.0-FS0 | 96 | 0 | 2.1 | 3.9 | −50 | −49 | 242 |
| PC-5.0-FS0 | 97 | 0 | 2.1 | 3.9 | −49 | −48 | 241 |
| PC-2.0-FS10 | 96 | 9 | 2.4 | 3.4 | −49 | −50 | 256 |
| PC-2.0-FS20 | 95 | 16 | 2.9 | 2.8 | −50 | −51 | 259 |
| PC-2.0-FS30 | 95 | 25 | 5.0 | 1.6 | −48 | −51 | 256 |

[a]Z = wt % BPO with respect to PMVL and FSQ = wt % FS with respect to PMVL; all samples produced with 162 kg mol$^{-1}$ PMVL relative to polystyrene standards in RI-SEC with CHCl$_3$ as the mobile phase.
[b]Calculated using E' from DMTA in equation 1.
[c]Determined from the maximum of the loss modulus from DMTA.
[d]Taken on the second heating ramp at a rate of 10° C. min$^{-1}$.
[e]Taken under air, defined as the temperature at which 5% mass loss is observed.

While the exact mechanism by which saturated polyesters cross-link in the presence of radicals has not been extensively studied, it has been suggested that the reaction of cyclohexane with BPO produces carbon radicals capable of a variety of reactions, most commonly resulting in dimers and other oligomers. The tertiary carbon within the backbone of PMVL is the most stable position for carbon radicals, and thus, while not wishing to be bound by any theory, it is assumed that the longer-lived radicals at the tertiary carbons allow for a more efficient reaction than at the methylene units along the backbone. Indeed, the PC elastomers exhibited higher gel fractions when compared to poly(ε-caprolactone) (PCL) cross-linked with BPO, which contains no tertiary carbons.

The reaction of PMVL with BPO did not afford a high degree of cross-linking at 0.1 and 0.5 wt % of BPO. PC elastomers prepared with 2 wt % and 3 wt % BPO exhibited very desirable tensile properties (FIG. 4A, Table 2) and outperformed all CC samples. At BPO loadings of 4 and 5 wt %, the materials began to drastically lose toughness, exhibiting significant decreases in tensile strength and elongation; furthermore, these samples no longer exhibited significant strain hardening. The 1 wt % BPO sample (black line) begins to tear near the grip above 1500% strain, making the observable tensile strength at break lower than its actual value.

In comparison, referring to FIG. 4B, CC-2.0-100 (Table 2) has a higher plateau modulus, yet exhibited higher strength and levels of strain hardening. Thus, while not wishing to be bound by any theory, presently available evidence indicates that the reduction in tensile properties seen at higher BPO loading is due to undesirable side reactions caused by a larger concentration of peroxide rather than an increase in the cross-linking density.

Similar to the CC elastomers, the radically cross-linked materials exhibited higher plateau moduli and better hysteresis recovery when the loading of BPO was increased (FIG. 4A). The large increase in tensile strength from CC to PC was not entirely expected. While not wishing to be bound by any theory, presently available evidence indicates that the difference in reactivity ratios between MVL and B6CC may have resulted in more network defects and a less uniform distribution of cross-links than in the PC elastomers. The radicals formed in the production of PC samples should theoretically have an equal probability of reacting with each repeat unit, which would result in a more uniform distribution of cross-links. As previously discussed, an applied force is more evenly dispersed in materials with evenly distributed cross-links, than in those with more network defects; as a result, the more uniform materials should be significantly stronger.

To further improve the mechanical properties of the PMVL elastomers, and to reduce the total cost of the elastomer, composites were prepared containing fumed silica, Aerosil R 812.

Although producing filler-reinforced materials using both the tandem cross-linking strategy of the Scheme A in FIG. 1A was attempted, it was observed that TBD catalyst used for the copolymerization reaction was intolerant of the FS. However, it was determined that FS reinforced elastomers could easily be prepared using the sequential radical melt blending route shown in the Scheme in FIG. 1B.

For all samples, the BPO loading was fixed at 2 wt % with respect to PMVL, and blends containing 10 to 30 wt % FS were prepared. The TGA data indicated that in all cases the incorporation of FS into the polymer matrix during twin-screw extrusion was slightly lower than the feed amount (Table 2). Since the TGA of Aerosil R 812 exhibited no mass loss up to 550° C., while not wishing to be bound by any theory, presently available evidence indicates that this minor discrepancy is due to inefficient extrusion rather than FS degradation, loss of water, or volatile small molecules adsorbed to the surface of the filler.

As expected, the mechanical properties of the PC elastomers improved dramatically when blended with FS (FIG. 4B, Table 2). The tensile strengths of the composites were improved by 50 to 83% relative to the neat elastomer and the elongation at break remained nearly constant at all filler loadings. Furthermore, the Young's modulus increased from 1.4 to 2.2 MPa when 25 wt % FS was incorporated. This significant stiffening effect from the FS was also observed by DMTA; the plateau modulus rose from 1.7 to 5.0 MPa when 25 wt % FS was incorporated (FIG. 4B, Table 2). As anticipated, increasing the amount of FS filler also increased the extent of the Mullins effect observed during hysteresis. Even at 9 wt % incorporation of FS, the appearance of the resulting elastomer was colorless and translucent.

Example 5—Production of Peroxide Cross-Linked PMVL (PC) and PC-Fumed Silica Composites (PC-FS)

PMVL homopolymer (2.00 g) and benzoyl peroxide (20 to 100 mg, 1 to 5 wt %) were loaded into a twin-screw extruder (DSM Xplore 5 mL micro compounder; Geleen, Netherlands) at 70° C. (10 h half-life for BPO) and allowed to mix for 10 min before extruding a grayish yellow material (ca. 80% recovery). Composites were also prepared with 10, 20, or 30 wt % fumed silica (FS) fed into the extruder (2 wt % BPO relative to PMVL was used for all composites).

The homogenous polymer mixture was placed in a 5 cm (W)×5 cm (L)×0.05 cm (T) aluminum mold that was placed between two 12 cm×12 cm aluminum plates with a thin Teflon® sheet (0.05 mm thick) over each plate. This was then placed in a press mold (Wabash MPI; Wabash, Ind.) at 150° C. and 3 tons of pressure for 10 min and rapidly cooled to room temperature over 5 min, affording a translucent, grayish yellow elastomer.

Samples are named as PC-Z-FSQ where Z represents the wt % BPO relative to PMVL and Q represents wt % FS fed into the extruder. For instance, a sample with 1 wt % BPO and 0 wt % FS would be denoted PC-1.0-FS0.

Example 6—Depolymerization of CC-0.50-100 or PC-2.0-FS0

CC-0.50-100 or PC-2.0-FS0 (ca. 1.00 g cut into small pieces), stannous octoate (1 drop, ca. 20 mg), and pentaerythritol ethoxylate (1 drop, ca. 20 mg, $M_n$=797 g/mol) were placed in a 10-mL round bottom flask equipped with a simple vacuum distillation apparatus. The mixture was heated to 150° C. overnight at 1 Torr, yielding a clear and colorless liquid (91% recovery for CC-0.50-100 and 93% for PC-2.0-FS0 after a mass correction for cross-linker was performed). The $^1$H-NMR spectrum of the distillate was identical to that of pure MVL (Figure S13).

To demonstrate the recyclability of the PMVL elastomers, the percentage of monomer was determined that was recoverable via chemical depolymerization of CCP-0.50-100 and PC-2.0-FS0. While CC should be easily depolymerizable, the backbones of the PC materials are chemically altered by the radical cross-linking reaction. It was uncertain whether the covalent linkages formed during the radical reactions would inhibit the depolymerization. To facilitate MVL recovery via depolymerization, stannous octoate and pentaerythritol ethoxylate (a high boiling tetraol) were added to the elastomers, and the resulting composition was heated to 150° C. overnight under vacuum. Both CC and PC elastomers were both capable of depolymerization, and 91% of pure MVL was recovered from CC-0.50-100 and 93% from PC-2.0-FS0.

Finally, the hydrolytic degradation of the elastomers was investigated in aqueous media. Samples were placed in PBS (pH=7.4), 1 M hydrochloric acid, and 1 M sodium hydroxide (FIG. 5). The elastomers proved to be resilient to degradation in PBS solutions at physiological conditions (37° C.) and in acidic solutions at room temperature, though PC-2.0-FS0 exhibited slight degradation in the basic solutions at room temperature (FIG. 5A). While not wishing to be bound by any theory, presently available evidence indicates that the poor hydrolytic degradability is likely due to the hydrophobic nature of the materials.

Increasing the temperature to 60° C. dramatically improved the degradation of the samples in both acid and base (FIG. 5B). As hydrochloric acid can behave as a polymerization catalyst for MVL, it is also capable of depolymerizing PMVL at elevated temperature and therefore, capable of degrading the samples. While not wishing to be bound by any theory, presently available evidence indicates that the increased temperature improved the penetration of polar moieties into the network, allowing accelerated basic degradation of PC-2.0-FS0.

Interestingly, CC-0.50-100 appeared to be highly resistant to the basic solution, even at 60° C.; this is somewhat counterintuitive given that esters are easily cleaved in the presence of hydroxide ions. The Young's modulus, plateau modulus, and gel content of PC-2.0-FS0 and CC-0.50-100 are almost identical, suggesting that either the carbonate moieties lend chemical resistance or that peroxide cross-linking may alter the chemical structure of PMVL in a way that leaves it more susceptible to degradation in basic conditions.

The present examples demonstrate that elastomers with a wide range of mechanical properties can be produced from PMVL. Tandem and radical cross-linking methodologies can both be successfully implemented depending on the desired processing conditions and physical/mechanical properties of the material.

The mechanical properties of the reported materials were far superior to similar low $T_g$, amorphous polyester elastomers reported in the literature, and the toughness could be improved further by incorporating FS.

The Young's modulus and tensile strength were improved by 57% and 83%, respectively, without sacrificing the elongation at break by incorporating up to 25 wt % FS in PC.

Furthermore, PC-FS materials were produced with similar tensile strength and elongation at break compared to synthetically challenging thermoplastic elastomers based on MVL and lactide. The ability to produce tough composite elastomers facilely with PC will greatly improve its viability as a commodity rubber.

Moreover, the recyclability of CC and PC was successfully demonstrated, as they were both able to depolymerize in the presence of catalyst to provide up to 93% recovery of MVL.

Finally, both polymers showed the ability to degrade under acidic conditions at 60° C., while only PC was capable of degradation in basic conditions; this apparent degradation is promising towards the sustainability of these materials.

Various modifications and alterations of this invention will be apparent to those skilled in the art without departing from this invention. This invention should not be restricted to that which has been set forth herein only for illustrative purposes.

The invention claimed is:

1. A method comprising reacting:
   a polymer comprising a monomeric unit derived from a lactone selected from the group consisting of β-lactones, γ-lactones and δ-lactones; with
   a cyclic carbonate compound comprising 2 to 5 cyclic carbonate moieties;
   an initiator compound chosen from alcohols and aromatic polyols; and
   a catalyst;
   to form a crosslinked polylactone elastomer, wherein the polylactone elastomer comprises linear monomeric units derived from the initiator compound, linear monomeric units derived from the polymer, and branched monomeric units derived from the cyclic carbonate compound.

2. The method of claim 1, wherein the lactone is alkyl-substituted.

3. The method of claim 1, wherein the lactone is a valerolactone.

4. The method of claim 1, wherein the cyclic carbonate compound comprises 2 cyclic carbonate moieties, and wherein the cyclic carbonate moieties comprise a ring with 4 to 6 members.

5. The method of claim 1, wherein the cyclic carbonate ranges from 0.25 mol % to 2 mol % with respect to the amount of lactone in the reaction.

6. The method of claim 1, wherein the catalyst comprises a guanidyl moiety.

7. The method of claim 6, wherein the catalyst is a bicyclic compound.

8. The method of claim 1, wherein the catalyst is present at about 0.1 mol % with respect to the amount of lactone in the reaction.

9. The method of claim 1, further comprising reacting the crosslinked polylactone elastomer to convert hydroxyl end groups thereon to acetate groups, wherein the hydroxyl end groups on the polylactone elastomer are converted to acetate groups by exposing the elastomer to a reaction mixture comprising acetic anhydride and an amine.

10. The method of claim 1, further comprising reacting the crosslinked polylactone elastomer with a polyol and a catalyst selected from the group consisting of Sn(II), Sn(IV), and combinations thereof, to depolymerize the polylactone and recover at least 90% of the lactone reactant.

* * * * *